Patented May 6, 1930

1,757,100

UNITED STATES PATENT OFFICE

CHARLES J. STROSACKER, OF MIDLAND, MICHIGAN, ASSIGNOR TO THE DOW CHEMICAL COMPANY, OF MIDLAND, MICHIGAN, A CORPORATION OF MICHIGAN

MANUFACTURE OF ALIPHATIC CHLOR COMPOUNDS

No Drawing.  Application filed December 9, 1924. Serial No. 754,858.

The present improvements relating, as indicated, to the manufacture of aliphatic chlor-compounds, have more particular regard to a method whereby trichlor-acetic acid ($CCl_3.CO_2H$) may be prepared by the direct chlorination of acetic acid.

The object of the present invention accordingly is to provide a relatively simple and direct method wherein acetic acid and chlorine, both of which are readily available, may be utilized as the basic ingredients in the process, viz, to make trichlor-acetic acid. To the accomplishment of the foregoing and related ends, the invention, then, consists of the steps hereinafter fully described and particularly pointed out in the claims, the following description setting forth but several of the various ways in which the principle of the invention may be used.

While trichlor-acetic acid may be variously prepared, I preferably make such acid by direct chlorination of acetic acid in the presence of a chlorinating catalyst, the reaction being carried out in stages at successively higher temperatures. It is known that monochlor-acetic acid may be prepared by directly chlorinating acetic acid. I have discovered that by conducting such chlorination in the presence of a catalyst such as acetic anhydride, sulphur, sulphur chloride, or phosphorous, and by continuing such chlorination at a somewhat higher temperature, the dichlor-compound is obtained, and upon still further continuing the chlorination with catalyst present at an elevated temperature, the trichlor-compound is obtained. The latter has a melting point (approximately 52° C.) higher than normal room temperature and so will solidify if allowed to cool to such temperature.

Since no stage-wise purifications are necessary in this process, it will be seen thus that partially chlorinated acetic acid, as for instance dichlor-acetic acid available sometimes as a by-product in a process primarily designed for the preparation of monochloracetic acid, can be conveniently worked up by further chlorination as described.

The temperature in the final chlorination stage will run up from 150 to 160° C. and such chlorination is carried to the point where from 85 to 90 per cent, of trichloracetic acid is formed. I have found that if it be attempted to add more chlorine decomposition will occur.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. The steps which consist in chlorinating acetic acid in the presence of a chlorinating catalyst to form mono-chlor acetic acid, and continuing such chlorination at successively higher temperatures until the tri-chlor compound is obtained.

2. The steps which consist in chlorinating acetic acid in the presence of a sulphur-containing catalyst to form mono-chlor acetic acid, and continuing such chlorination at successively higher temperatures until the trichlor compound is obtained.

3. The steps which consist in chlorinating acetic acid in the presence of sulphur chloride to form monochlor acetic acid, and continuing such chlorination at successively higher temperatures until the trichlor compound is obtained.

4. The steps which consist in chlorinating acetic acid in the presence of a chlorinating catalyst to form monochlor acetic acid and continuing such chlorination at successively higher temperatures up to approximately 150° to 160° C. whereat from 85 to 90 per cent. of trichlor-acetic acid is formed.

5. The steps which consist in chlorinating acetic acid in the presence of sulphur chloride to form monochlor acetic acid, and continuing such chlorination at successively higher temperatures up to approximately 150° to 160° C. whereat from 85 to 90 per cent. of trichlor-acetic acid is formed.

Signed by me this 6th day of December, 1924.

CHARLES J. STROSACKER.